United States Patent
Gieseke et al.

(10) Patent No.: US 8,574,711 B2
(45) Date of Patent: Nov. 5, 2013

(54) STRUCTURAL OR CHASSIS PART OF A MOTOR VEHICLE

(71) Applicants: Torsten Gieseke, Barsinghausen (DE); Oliver Kleinschmidt, Dortmund (DE); Lothar Patberg, Moers (DE)

(72) Inventors: Torsten Gieseke, Barsinghausen (DE); Oliver Kleinschmidt, Dortmund (DE); Lothar Patberg, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/850,035

(22) Filed: Mar. 25, 2013

(65) Prior Publication Data

US 2013/0244014 A1    Sep. 19, 2013

Related U.S. Application Data

(63) Continuation of application No. PCT/EP2011/066570, filed on Sep. 23, 2011.

(30) Foreign Application Priority Data

Sep. 28, 2010  (DE) .................. 10 2010 037 817

(51) Int. Cl.
   *B32B 3/26*    (2006.01)
(52) U.S. Cl.
   USPC .............. 428/319.1; 428/34.1; 428/319.3; 428/319.7
(58) Field of Classification Search
   USPC .............. 428/31.1, 319.1, 319.3, 319.7, 600, 428/613, 607; 429/176, 177
   See application file for complete search history.

(56) References Cited

U.S. PATENT DOCUMENTS

| | | | |
|---|---|---|---|
| 8,247,050 B2 * | 8/2012 | McCrea et al. | 428/35.8 |
| 8,394,473 B2 * | 3/2013 | McCrea et al. | 428/35.8 |
| 8,426,058 B2 * | 4/2013 | Gong et al. | 429/163 |
| 8,470,111 B2 * | 6/2013 | Boger et al. | 156/78 |
| 8,491,922 B2 * | 7/2013 | Eddy | 424/405 |
| 2004/0229120 A1 * | 11/2004 | Hatta et al. | 429/176 |
| 2010/0028649 A1 * | 2/2010 | Trouilhet et al. | 428/309.9 |
| 2010/0196736 A1 * | 8/2010 | Boger et al. | 428/621 |
| 2010/0233505 A1 * | 9/2010 | Boger et al. | 428/613 |
| 2013/0143058 A1 * | 6/2013 | McCrea et al. | 428/551 |

FOREIGN PATENT DOCUMENTS

| | | |
|---|---|---|
| DE | 38 18 479 A1 | 12/1989 |
| DE | 199 39 227 A1 | 3/2001 |
| DE | 102 21 582 A1 | 12/2003 |
| DE | 20 2006 019 341 U1 | 3/2007 |
| DE | 698 36 259 T2 | 6/2007 |
| DE | 10 2007 009 928 A1 | 7/2008 |
| DE | 10 2007 035 228 A1 | 11/2008 |
| DE | 10 2009 006 130 A1 | 7/2010 |
| DE | 10 2009 014 194 A1 | 9/2010 |

* cited by examiner

*Primary Examiner* — N. Edwards
(74) *Attorney, Agent, or Firm* — Reinhart Boerner Van Deuren P.C.

(57) ABSTRACT

The invention relates to a structural or chassis component of a motor vehicle, said structural or chassis component consisting of a composite material comprising an outer metallic layer, a middle plastics or plastics foam layer and an outer fiber-reinforced plastics layer. The object of providing a structural or chassis component which allows a further reduction in weight to be made without adversely affecting the load bearing capacity characteristics is achieved in that the thickness of the middle plastics layer is at least 0.2 mm.

18 Claims, 2 Drawing Sheets

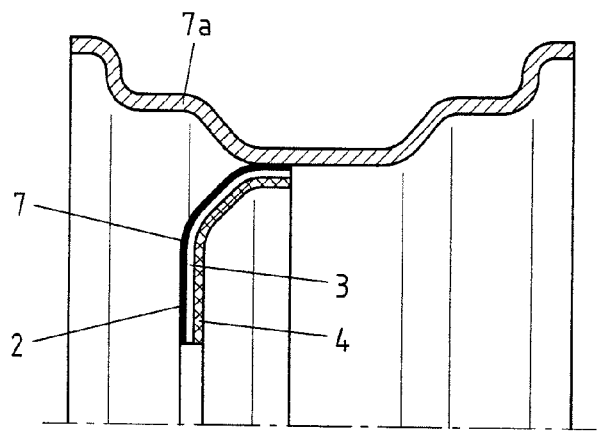
Fig.4
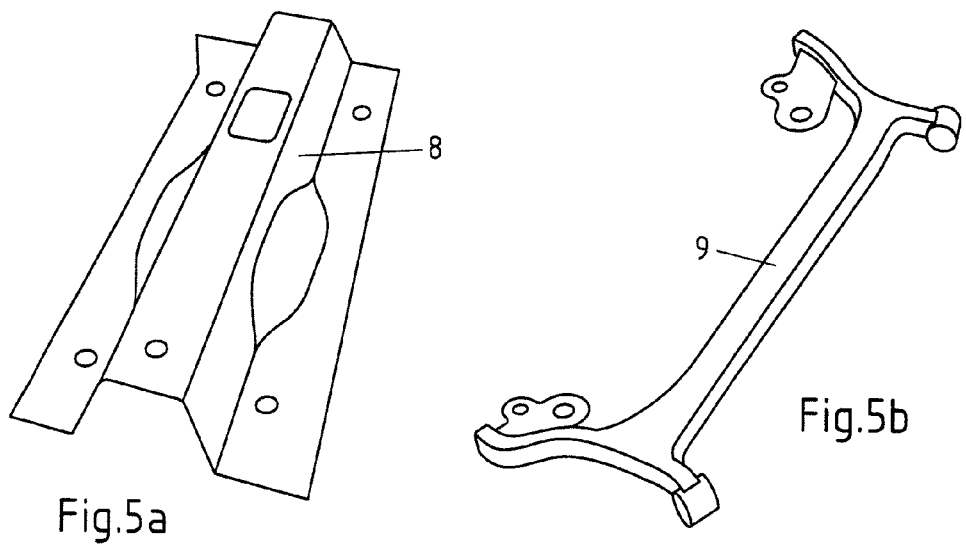
Fig.5a
Fig.5b
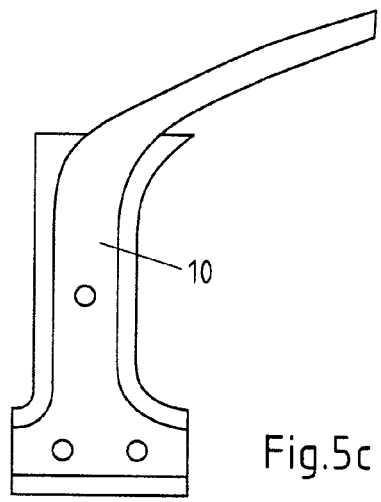
Fig.5c

STRUCTURAL OR CHASSIS PART OF A MOTOR VEHICLE

CROSS-REFERENCE TO RELATED PATENT APPLICATIONS

This patent application is a continuation of PCT/EP2011/066570, filed Sep. 23, 2011, which claims priority to German Application No. 102010037817.8, filed Sep. 28, 2010, the entire teachings and disclosure of which are incorporated herein by reference thereto.

FIELD OF THE INVENTION

The invention relates to a structural or chassis component of a motor vehicle, the structural or chassis component consisting of a composite material comprising an outer metallic layer, a middle plastics or plastics foam layer and an outer fibre-reinforced plastics layer.

BACKGROUND OF THE INVENTION

Motor vehicles must constantly meet new demands. Thus, there is a general need to reduce the weight of the motor vehicle while the safety requirements remain the same. The safety requirements are guaranteed by structural or chassis components. Thus, considered as structural parts in the context of the present invention are, for example, parts of the undercarriage, floor panels, floor pans, door impact bars, roof reinforcements, window frame reinforcements, bumpers, B-column reinforcements and B-columns, instrument panel supports, battery cases, tank containers, water tanks, spare wheel recesses, etc. Common to the mentioned structural parts is that they are not part of the visible skin of the motor vehicle and are mainly used, due to their supporting function, to receive and/or transmit forces which act on the motor vehicle. Considered as chassis components in the context of the present invention are, for example, crossmembers of the chassis, subframes, suspension arms, hinge bearings, stabilisers, engine cross members, twist-beam rear axles, wheel control modules, but also the wheel shell of a rim. Chassis components are therefore components which have a functional association with the chassis or with the driving characteristics of the motor vehicle and thereby with the safety requirements for motor vehicles.

In the case of materials which have generally been used hitherto for structural and chassis components of a motor vehicle, the limits for further reductions in weight for structural or chassis components consisting of a single material have almost been reached. German patent DE 102 21 582 B4 discloses the use of composite materials in motor vehicles for skin components, in particular vehicle roofs. The composite material consists of a metal layer with an underlying plastics layer of thermoplastic and of a third layer consisting of a fibre-reinforced plastics material.

Furthermore, DE 10 2009 006 130 A1 discloses a planar component for motor vehicles which consists of a composite component of at least three different material layers, namely a carrier layer of metal, an adhesive layer of elastomer and a cover layer of carbon fibre-reinforced or mixed carbon fibre-reinforced plastics material.

From the prior art (DE 38 18 479 A1), a composite material is also known for external components of motor vehicles, which consists of a metal layer, an adhesive and a polypropylene layer.

Finally, DE 10 2007 009 928 A1 discloses a hybrid component for automobile manufacture which also consists of a metal-plastics-composite body with a metal component and a glass fibre-reinforced plastics component, an adhesive layer being provided between the two components.

SUMMARY OF THE INVENTION

On this basis, the object of the present invention is to provide a structural or chassis component which allows a further reduction in weight, without adversely affecting the load bearing capacity characteristics.

The object mentioned above for a structural or chassis component of a motor vehicle is achieved in that the thickness of the middle plastics layer is at least 0.2 mm. In the structural component or chassis component according to the invention of a motor vehicle, the metallic layer is not used for load bearing purposes. The load bearing capacity of the structural component or chassis component according to the invention is provided by the fibre-reinforced plastics layer. Due to the thermoplastic or thermosetting middle plastics layer or plastics foam layer of the composite material, the fibre structure of the fibre-reinforced outer thermoplastic or thermosetting plastics layer is not pressed outwards. Furthermore, local stress peaks, for example due to stone chips are damped in the direction of the fibre-reinforced plastics layer, and therefore the rigid and brittle fibre-reinforced plastics material cannot crack. The outer metallic layer of the composite material is used on the one hand to protect the thermoplastic or thermosetting middle layer against moisture, for example, and on the other hand, it serves as a skin, but also as an indicator of a possible overload of the structural component or chassis component. For example, cracks or bulges in the metallic layer can be an indication of an overload. The consistent use of the composite material in the structural or chassis components according to the invention enables a further, significant reduction in weight for motor vehicles. The construction of the structural or chassis components also allows a permanent use in the motor vehicle without the loss of characteristics, since for example the more sensitive fibre-reinforced plastics material layer can be protected by the other layers.

According to a first configuration of the structural or chassis component, the fibre-reinforced, thermoplastic or thermosetting plastics layer comprises glass fibres and/or carbon fibres. Glass fibre-reinforced plastics layers are usually cheaper than carbon fibre-reinforced plastics layers. However, they are restricted in respect of their load bearing capacity compared to carbon fibre-reinforced plastics layers. They do, however, allow a simpler production, for example in the injection moulding process. On the other hand, carbon fibre-reinforced plastics layers have a maximum strength with a very low weight, thus providing a minimum weight of the structural or chassis components. It is also possible to use other types of fibres, for example aramid, polyethylene, basalt and boron. Metal fibres, in particular steel fibres can also be used to reinforce the outer plastics layer and they have the advantage that the outer plastics layer becomes electrically conductive and can thus be welded together with other components. A corona treatment or flame treatment is preferably carried out to improve the adhesion and painting of the surfaces of the fibre-reinforced plastics material.

Thermoplastics contain, for example, polyolefins, polyamides, polyesters, polyethylenes, polypropylenes or a blend of the different plastics. The thermoplastics layers are preferably based on a polyamide and/or polyethylene. On the one hand, both thermoplastics can be processed very effectively, and on the other, they have advantageous characteristics in respect of the hot formability thereof. Compared to polyethylene, polyamide is basically more temperature resistant and can also be used in high temperature ranges.

Thermosetting plastics are temperature resistant and, for example, can be used in ranges in which relatively high temperatures can occur, particularly for a short time.

According to a further configuration of the structural or chassis component, the thickness of the fibre-reinforced plastics is from 0.2 mm to 1.0 mm, and preferably at most 0.8 mm, to achieve the required strengths with a minimum weight.

According to a further configuration of the structural or chassis component, it is provided that the thickness of the middle thermoplastic or thermosetting plastics layer is at most 3.0 mm, preferably at most 1.0 mm. To prevent fibres from being pressed out of the carbon fibre-reinforced plastics layer into the superimposed metallic layer and at the same time to protect the fibre-reinforced thermoplastic or thermosetting plastics layer against stress peaks, the thickness of the middle plastics layer is 0.2 mm. A very good compromise between an increased weight and preventing the fibres from being pressed out into the outer metallic layer is provided by using a middle plastics layer which is up to 1.0 mm thick. It is also possible to use a plastics foam layer. The thickness of the middle layer can be between 0.2 mm and 50 mm, preferably from 3.0 mm to 30 mm. An increase in the thickness of the middle layer can be used in particular for insulation areas. Furthermore, with the same thickness, plastics foam layers also have a reduced weight compared to solid plastics layers.

As already stated, the outer metallic layer merely serves to protect the layers of thermoplastic or thermosetting plastics against stone chips, for example, and also acts as an indicator of a possible overload by the formation of folds or cracks. To serve this purpose with the least possible weight increase, a configuration of the structural or chassis components provides that the thickness of the metallic layer is from 0.1 mm to 0.5 mm, and is preferably at most 0.3 mm. The use of an anticorrosive layer on one or both sides of the metallic layer can successfully counteract corrosion of the outer metallic layer, caused for example by atmospheric exposure.

According to a further configuration of the structural or chassis component, the metallic layer consists of steel, in particular of galvanised steel. Steel is not only economical, but also provides the necessary forming characteristics required for the production of complex structural or chassis components. Of course, it is also possible to use aluminium or other metallic layers in the structural or chassis component.

To allow the production of complex-formed structural or chassis components, it is advantageous if the structural or chassis components have been formed in a hot state. In the present context, "in a hot state" means that particularly the thermoplastic, which is preferably used in the middle layer and in the fibre-reinforced plastics layer, becomes soft and accordingly formable. For this purpose, the components have to be heated to the temperature necessary for the plastics, for example to the softening temperature. The thermoplastic is formed at a temperature of between 180° C. and max. 250° C., attention duly being paid to the resistance or temperature stability of the thermoplastic which is used. The structural or chassis component is preferably a floor panel, a floor pan, a battery case, a tank container, a water tank, a spare wheel recess, a wheel shell of a rim, a tunnel reinforcement, a twist-beam rear axle or multi-link axle or an A-, B- or C-column reinforcement. It is also possible for the rim itself to consist of the described composite material. In the case of all these structural or chassis components, the use of the composite material makes it possible to significantly reduce the weight, while the strength and use characteristics in the motor vehicle remain the same.

The structural or chassis component is subjected to different load stresses. In the event of an overload which can result in damage to the stressed component, it is possible to detect or establish the damage as a deformation in the metallic layer. In the case of specific types of load, these deformations can appear in an irregularity of the sheet thickness, but also by plastic deformation which can be detected visually, for example. When a damaged component has been found, it can be exchanged or replaced.

BRIEF DESCRIPTION OF THE DRAWINGS

In the following, the invention will be described in more detail on the basis of exemplary embodiments in conjunction with the drawings, in which:

FIG. 4 is a schematic sectional view of a wheel disc of a rim, and FIG. 5a), b), c) are perspective views of exemplary embodiments of further structural or chassis components of a motor vehicle.

DETAILED DESCRIPTION OF THE INVENTION

Figure 1:
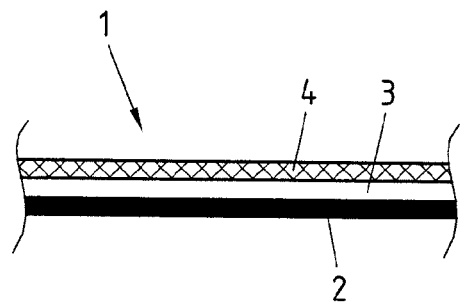
FIG. 1 is a side view of an exemplary embodiment of a composite material.

First of all, FIG. 1 shows the composite material 1 which is used for the structural or chassis components. The composite material consists of a metallic outer layer 2, preferably consisting of a steel sheet having a thickness of 0.1 mm to 0.5 mm. The metallic layer 2 is preferably constructed from anticorrosive steel, for example galvanised steel. The middle thermoplastic layer 3 is preferably based on a polyamide or polyethylene; this means that this layer is either produced from a specific polyamide or polyethylene, or from a blend containing polyethylene and/or polyamide. The fibre-reinforced thermoplastic layer 4, also based on a polyethylene or a polyamide, is reinforced with glass fibres and/or carbon fibres.

Figure 2:
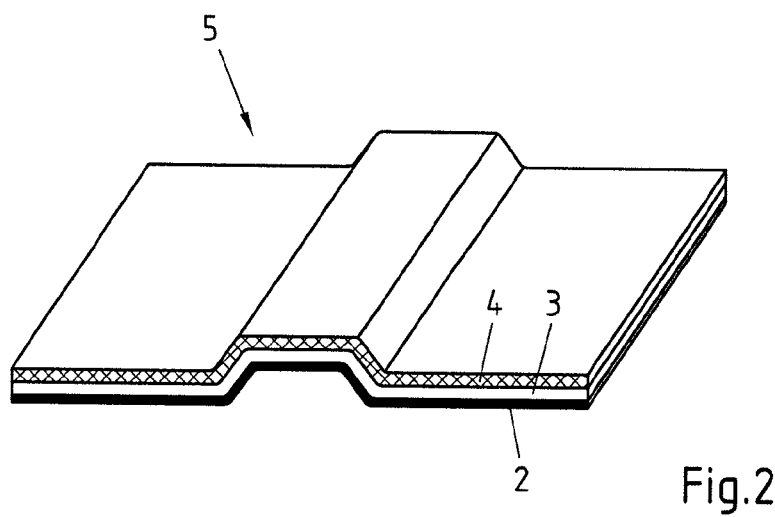
FIG. 2 is a perspective view of a first exemplary embodiment of a structural component of a motor vehicle in the form of a floor panel.

FIG. 2 is a perspective view of a typical structural component of a motor vehicle in the form of a floor panel 5. In the illustrated exemplary embodiment of a floor panel 5, the outer metallic layer 2 has a thickness of 0.4 mm. To protect the 0.7 mm thick carbon fibre-reinforced thermoplastic layer 4 against stone chips, in the present exemplary embodiment the middle thermoplastic layer has a thickness of 0.5 mm. In spite of the total thickness of approximately 1.6 mm of the illustrated floor panel 5, the weight of the floor panel is significantly reduced compared to conventional floor panels, due to the high proportion of plastics material.

Figure 3:
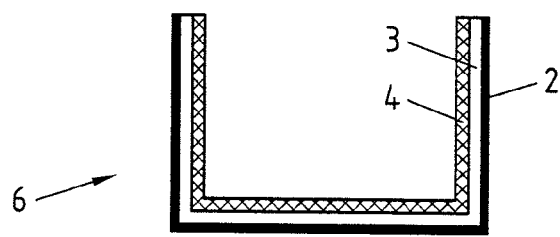
FIG. 3 is a sectional view of a second exemplary embodiment of a structural component in the form of a battery case.

This also applies to the battery case 6 illustrated in a schematic sectional view in FIG. 3. Due to the lower strength requirements imposed on a battery case 6, the three different layers of the composite material each have in this example a thickness of 0.2 mm, thus producing a total thickness of 0.6 mm. In spite of the extremely low thickness of the battery case 6 in this exemplary embodiment, the strength values suffice in providing the battery case 6 with the rigidity or load bearing capacity required for use.

FIG. 4 is a schematic sectional view of a wheel shell 7 produced from the composite material. Here, the thickness of the steel layer 2 is 0.3 mm and is to protect the inner layers of the composite material, in particular the fibre-reinforced plastics layer against stone chips. The thickness of the middle thermoplastic layer 3 is 0.4 mm and that of the fibre-reinforced thermoplastic layer 4 is 0.6 mm. In principle, it is also possible to produce the rim band 7a from a composite material comprising an outer metallic layer, a middle thermoplastic layer and an outer thermoplastic, fibre-reinforced layer. In this case, the fibre-reinforced thermoplastic layer could be directed towards the inside of the tyre.

FIG. 5 shows in FIGS. 5a), 5b) and 5c) different exemplary embodiments of structural or chassis components which consist of the composite material, comprising an outer metallic layer, a middle thermoplastic layer and an outer fibre-reinforced thermoplastic layer. FIG. 5a) shows a tunnel reinforcement 8, FIG. 5b) shows a twist-beam rear axle 9 and FIG. 5c) shows an A-column reinforcement 10. The illustrated exemplary embodiments show the regions in which structural components or chassis components can be used with the construction according to the invention, thereby making it possible to save a considerable amount of weight.

Depending on requirements, the middle thermoplastic layer can also be configured as a plastics foam layer or can be replaced by a thermosetting plastics/plastics foam layer. The fibre-reinforced plastics layer can also be formed on the basis of thermosetting plastics.

The invention claimed is:

1. Structural component of a motor vehicle, said structural component consisting of a composite material comprising an outer metallic layer, a middle plastics or plastics foam layer and an outer fibre-reinforced plastics layer, wherein the thickness of the middle plastics layer is at least 0.2 mm and that the structural component is not part of the visible skin and is mainly used to receive and/or transmit forces which act on the motor vehicle.

2. Chassis component of a motor vehicle, said chassis component formed of a composite material comprising an outer metallic layer, a middle plastics or plastics foam layer and an outer fibre-reinforced plastics layer, wherein the thickness of the middle plastics layer is at least 0.2 mm.

3. Component according to claim 1, wherein the middle plastics or plastics foam layer and/or the outer plastics layer consists of a thermoplastic and/or a thermosetting plastics material.

4. Component according to claim 1, wherein the thickness of the fibre-reinforced plastics layer is from 0.2 mm to 1.0 mm.

5. Component according to claim 1, wherein the thickness of the middle plastics layer is at most 3.0 mm.

6. Component according to claim 1, wherein the thickness of the middle plastics foam layer is from 3.0 mm to 50 mm.

7. Component according to claim 1, wherein the metallic layer has a thickness of from 0.1 mm to 0.5 mm and optionally an anticorrosive layer.

8. Component according to claim 1, wherein the component was formed in a hot state.

9. Component according to claim 1, wherein the component is a floor panel, a floor pan, a battery case, a tank container, a water tank, a spare wheel recess, a wheel shell of a rim, a tunnel reinforcement, a twist-beam rear axle or an A-, B- or C-column reinforcement.

10. Component according to claim 1, wherein in the event of an overload, the metallic layer exhibits a deformation.

11. Component according to claim 2, wherein the middle plastics or plastics foam layer and/or the outer plastics layer consists of a thermoplastic and/or a thermosetting plastics material.

12. Component according to claim 2, wherein the thickness of the fibre-reinforced plastics layer is from 0.2 mm to 1.0 mm.

13. Component according to claim 2, wherein the thickness of the middle plastics layer is at most 3.0 mm.

14. Component according to claim 2, wherein the thickness of the middle plastics foam layer is from 3.0 mm to 50 mm.

15. Component according to claim 2, wherein the metallic layer has a thickness of from 0.1 mm to 0.5 mm and optionally an anticorrosive layer.

16. Component according to claim 2, wherein the component was formed in a hot state.

17. Component according to claim 2, wherein the component is a floor panel, a floor pan, a battery case, a tank container, a water tank, a spare wheel recess, a wheel shell of a rim, a tunnel reinforcement, a twist-beam rear axle or an A-, B- or C-column reinforcement.

18. Component according to claim 2, wherein in the event of an overload, the metallic layer exhibits a deformation.

* * * * *